3,294,552
PROCESS OF MAKING HONEY-SUGAR SYRUP
Harry Topalian, Dover, Del., assignor to General Foods Corporation, White Plains, N.Y., a corporation of Delaware
No Drawing. Filed Nov. 15, 1963, Ser. No. 323,888
4 Claims. (Cl. 99—142)

This invention relates to a pourable table syrup of unique flavor made from an aqueous solution of honey and sugar and, more specifically, to an aqueous syrup made from honey and maple sugar.

An aqueous syrup combining the taste impact of honey and sugar which is clear in appearance and stable upon storage, has not yet been produced due to the tendency of the honey to foam and flocculate during processing. This processing problem has prevented the incorporation of honey in aqueous solutions of such sugars as cane syrup, corn syrup, maple syrup, or mixtures of these syrups.

It would be desirable if a stable, pourable, clear table syrup could be produced having both a honey and sugar flavor and, more specifically, both a honey and maple flavor.

It has now been discovered that a table syrup in the form of a stable, pourable, clear aqueous solution of honey and sugar, can be prepared, said honey being present at a level of 1–30% by weight based on the total weight of the composition.

The sugar solution may comprise any edible, water-soluble sugar such as sucrose, dextrose, fructose, or maltose. Mixtures of suitable sugars may also be employed, including mixtures of the above sugars with a partially hydrolyzed starch, i.e. corn syrup made from corn syrup solids and having a dextrose equivalent of 0–60, preferably 24–60. A preferable mixture of sugars will include 5–15% by weight maple syrup as the flavoring ingredient, 5–40% by weight corn syrup and at least 40% by weight cane syrup (sucrose), these weight percentages being based on the total weight of the table syrup composition.

The table syrup of this invention is prepared by forming an aqueous mixture of honey and sugar, blending said mixture at a temperature of about 145° to 165° F. to form a homogeneous aqueous solution of said honey and sugar, raising the temperature of said solution to about 165° to 175° F., filtering said solution, filling containers with said solution while keeping the solution at about 165° to 175° F., sealing said containers and maintaining the hot solution within said sealed containers at about 165° to 175° F. for at least 5 minutes to thereby assure a sterile product which is not susceptible to deterioration upon extended storage.

It is understood that the above processing conditions are essential in order to produce an aqueous honey-sugar blend which when bottled is stable to extended storage and free of any insoluble residue. If the above temperature limits are exceeded, excessive foaming of the product will occur, making processing of the syrup very difficult. Also, the high temperature will cause production of an unsightly flocculent precipitate due to degradation of the protein and levulose which are naturally present in bees honey. If temperatures below those recited are used, the syrup will be too viscous to handle and process properly. Moreover, if the syrup is packed at temperatures below 165° F. a sterile bottled product will not be assured and the syrup will experience bacterial deterioration upon storage as evidenced by mold growth.

Other flavoring ingredients besides the maple syrup may be added to the table syrup of this invention. These ingredients include maple flavor, fresh fruit syrups, crushed fruit, etc. However, in adding these ingredients, care should be taken to adjust the sugar content of the aqueous solution to 70% or above.

This invention will now be more fully described by reference to the following examples.

*Example I*

Ingredients:                                              Percent by weight
  Cane-corn syrup blend (4:3) (73.6° Brix) __ 55.6
  Cane syrup (67.3° Brix) _____ 34.4
  Maple sugar syrup (67.5° Brix) _____ 7.5
  Honey (81.0% solids) _____ 2.5

The cane-corn syrup blend was prepared at a ratio of 3 pounds of corn sugar solids to 4 pounds of cane sugar solids, blending being accomplished in a blending tank at a temperature of about 160° F. to achieve a Brix value of 73.5. Cane syrup having a Brix value of 67.5 was then prepared from sugar and the honey was adjusted to give a solids level of 81.0%. Maple syrup having a Brix value of 66.5 was made from blocks of maple sugar which were crushed, mixed with water and then boiled in a steam-jacketed tank. The liquid maple was brought to a rolling boil and boiling was continued until the syrup became clear and foaming ceased. The Brix was then raised to 67.5° before blending with the remaining ingredients.

The ingredients were then blended in a blending kettle by first placing the cane-corn syrup in the kettle at 160° F. Cane syrup was then added to the kettle at a temperature of 190° F., the maple syrup and the honey then being added at a temperature of 135°F. Steam was used to raise the blend temperature to 150° F. and the mixture was agitated for about 10–15 minutes to achieve a uniform dispersion. The blended syrup was then pumped to a heat exchanger and the temperature raised to 175° F. in preparation for the bottling operation. The syrup was filtered and then pumped into the bottles at an in-bottle temperature of 165° to 175° F. and capped within 15 seconds of coming off the filler in order to assure sterile conditions. After capping, the bottles were tilted and held for one second to assure contact of the hot syrup with the cap portion of the sealed bottle. The syrup within the bottles was kept at 165° to 175° F. for at least 5 minutes and allowed to slowly cool to room temperature. The final table syrup was clear, non-foaming, had no unsightly residue, and was stable on storage. The syrup had a unique honey-maple flavor and a smooth sweetness.

*Example II*

The maple-honey syrup was prepared in accordance with the procedure of Example I, except that the cane-corn syrup blend was omitted from the blend and about a 90.0% level of cane syrup was substituted for the 34.4% level of cane syrup. The final table syrup had a distinct honey-maple flavor with the sweetness impact being much higher than the Example I product.

*Example III*

The procedure of Example I was used in preparing a honey-maple table syrup with the exception that about 3 gallons of caramel was added to 500 gallons of liquid maple syrup prior to boiling the syrup. The final product was similar to that of Example I, but had a darker, more attractive color.

*Example IV*

The procedure of Example I was followed with the exception that the blended syrup was raised to a temperature of 190° F. prior to bottling and bottled at an in-bottle temperature of 180° to 190° F. This table syrup was found to soon develop unsightly flocculent residues and excessive foaming of the syrup hindered bottling of the product.

*Example V*

The procedure of Example I was followed with the exception that the blended syrup was kept at a temperature of 150° and bottled at this temperature. This bottled product was found to soon develop mold growth or experience bacterial degradation upon storage.

While this invention has been described by reference to specific examples, it is understood that reference should be made to the appended claims for a definition of its scope.

What is claimed is:

1. A process of preparing a table syrup composition in the form of a stable, pourable, clear liquid which comprises forming an aqueous mixture consisting essentially of honey and sugar, said honey being present at a level of 1–30% by weight based on the total weight of the composition, blending said mixture at a temperature of about 145° to 165° F. to form a homogeneous aqueous solution of said honey and sugar, raising the temperature of said solution to about 165° to 175° F., filtering said solution, filling containers with said solution while keeping the solution at about 165° to 175° F., sealing said containers and maintaining the solution within said sealed containers at about 165° to 175° F. for at least 5 minutes to thereby assure a sterile product not susceptible to deterioration upon extended storage.

2. The process of claim 1 wherein the aqueous mixture of honey and sugar contains 5–15% by weight maple syrup based on the total weight of the table syrup.

3. The process of claim 1 wherein the aqueous mixture of honey and sugar contains 1–30% by weight honey, 5–15% by weight maple syrup, 5–40% by weight corn syrup and at least 40% by weight cane syrup.

4. The process of claim 1 wherein the aqueous mixture of honey and sugar contains about 7.5% by weight maple syrup and about 2.5% by weight honey.

References Cited by the Examiner

UNITED STATES PATENTS

| 54,492 | 5/1866 | Birdsall | 99—142 |
| 3,057,734 | 10/1962 | Pader | 99—142 |

FOREIGN PATENTS 732,429   7/1932   France.

A. LOUIS MONACELL, *Primary Examiner.*

S. E. HEYMAN, *Assistant Examiner.*